Figure 3:
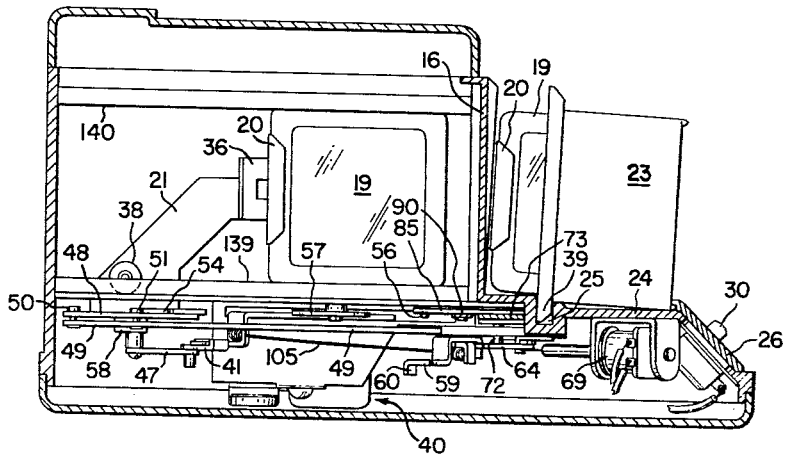

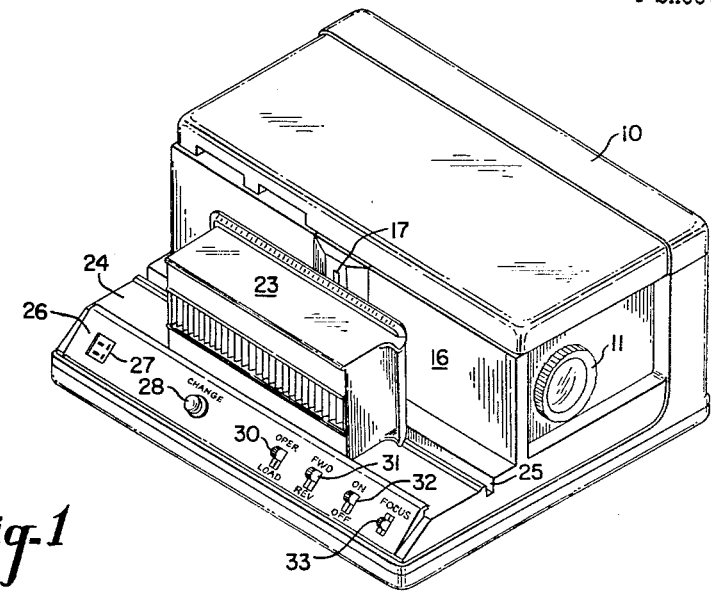
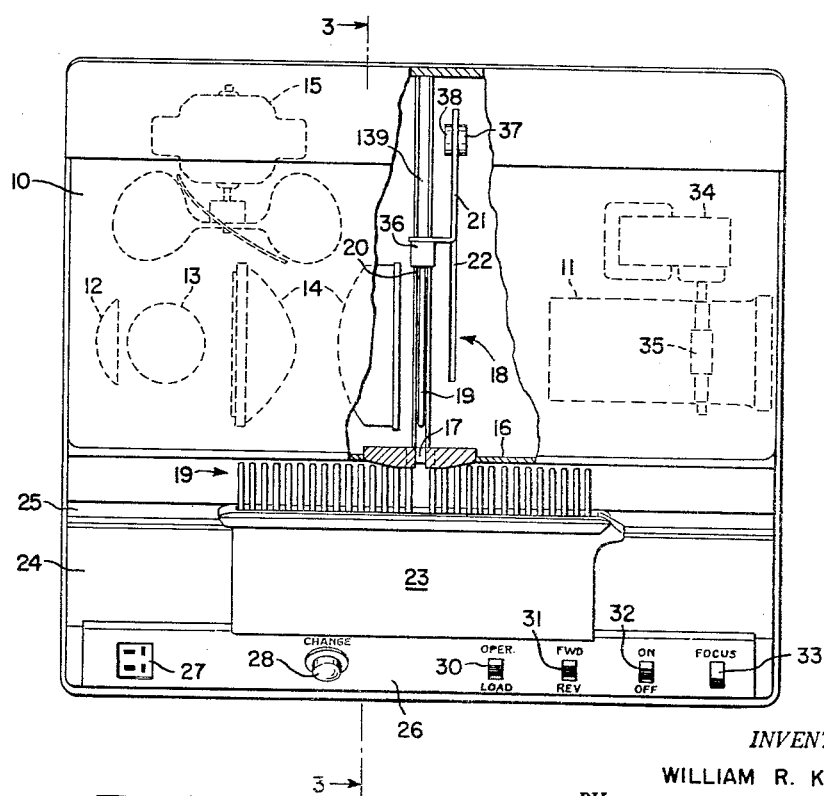

Sept. 5, 1961  W. R. KING  2,998,750
PHOTOGRAPHIC SLIDE PROJECTOR
Filed June 29, 1960  4 Sheets-Sheet 2

INVENTOR.
WILLIAM R. KING
BY
*Francis A. Lin*
ATTORNEY

Sept. 5, 1961   W. R. KING   2,998,750
PHOTOGRAPHIC SLIDE PROJECTOR
Filed June 29, 1960   4 Sheets-Sheet 3

INVENTOR.
WILLIAM R. KING
BY
ATTORNEY

Sept. 5, 1961      W. R. KING      2,998,750
PHOTOGRAPHIC SLIDE PROJECTOR

Filed June 29, 1960      4 Sheets-Sheet 4

INVENTOR.
WILLIAM R. KING
BY
*Francis A. Sirr*
ATTORNEY

United States Patent Office 2,998,750
Patented Sept. 5, 1961

2,998,750
PHOTOGRAPHIC SLIDE PROJECTOR
William Roy King, Denver, Colo., assignor to Minneapolis-Honeywell Regulator Company, Minneapolis, Minn., a corporation of Delaware
Filed June 29, 1960, Ser. No. 39,531
4 Claims. (Cl. 88—28)

This invention is concerned with a photographic slide projector and particularly with a slide projector of the automatic or electrical type which utilizes a photograhpic slide storage tray holding a plurality of individual photographic slides and having means including an electric motor to facilitate changing of the slides synchronized with step movement of the slide storage tray. Furthermore, the photographic slide projector of the present invention may be provided with means to affect control of the projector from a remote position.

Prior art projectors of this general type utilize an electric motor which supplies the energy or power to operate the various components of the projector. For example, in this general type of projector it is the usual practice to provide an electrical switch which when actuated energizes the motor and causes a slide to be returned from a projection compartment within the projector to the slide storage tray, the slide tray to be then advanced, and a second slide to be moved from the slide storage tray to the projection compartment to thereby be projected on a screen or the like.

The present invention provides an improved projector of this general type in which the electrical and mechanical components of the projector are constructed and arranged to provide the optimum in simplicity of construction without sacrificing reliability. In the apparatus of the present invention, a slide changing mechanism is mechanically coupled to the electric motor and movement of the motor and of the slide changing mechanism is effective to move a slide from the projection compartment to the slide storage tray. Once the slide has been returned to the tray, further movement of the motor is effective to actuate a slide tray moving mechanism to move the slide storage tray either in a forward or a reverse direction. During movement of the slide storage tray, an arrangement is provided to lock the storage tray once it has moved a distance equal to the spacing of the individual slides within the tray. This locking of the slide tray prevents inadvertent movement of the tray by the operator of the projector while a second slide is being moved from the storage tray to the projection compartment to be projected on a screen or the like.

Furthermore, the electrical circuitry of the present invention provides an arrangement whereby various switches are electrically interlocked to provide trouble free operation. For example, in the apparatus of the present invention, an arrangement is provided whereby, when it is desired to remove the slide storage tray from the projector, the electric motor is stopped at the instant that the slide within the projector is returned to the tray and switch interlock means are provided whereby the slide tray lock is not now operative to lock the tray.

Figure 4:
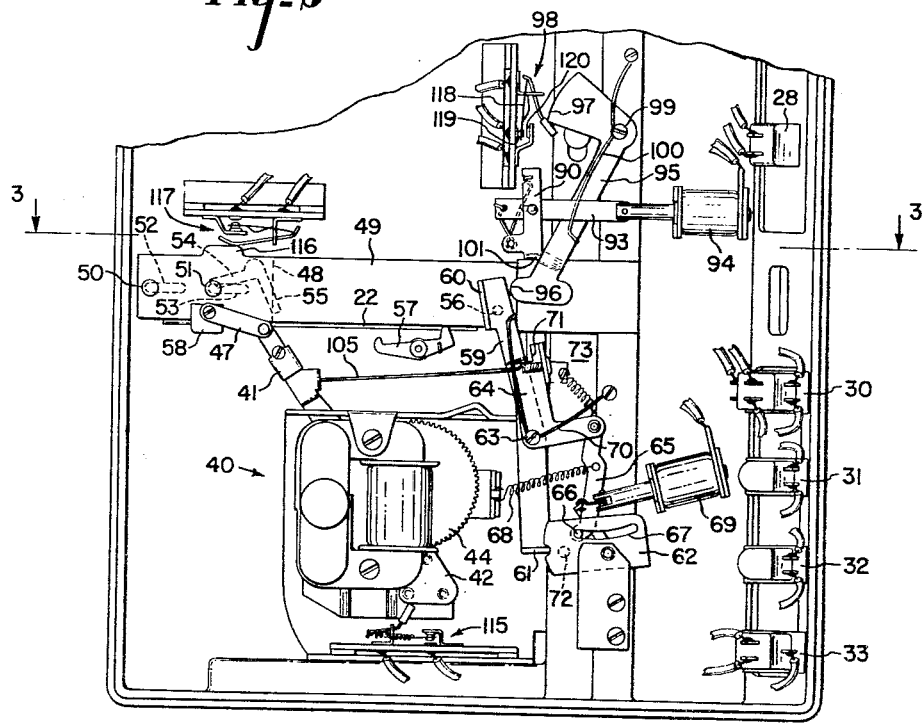
Figure 5:
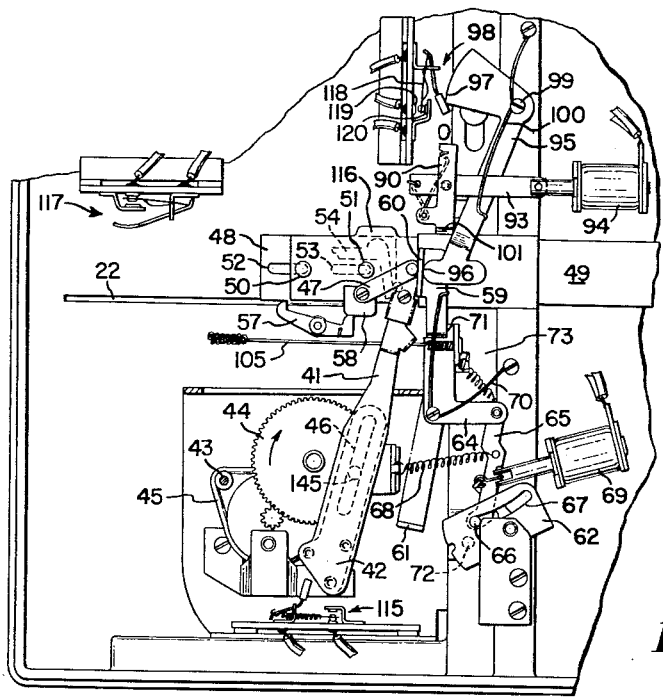
Figures 6, 7, 8:
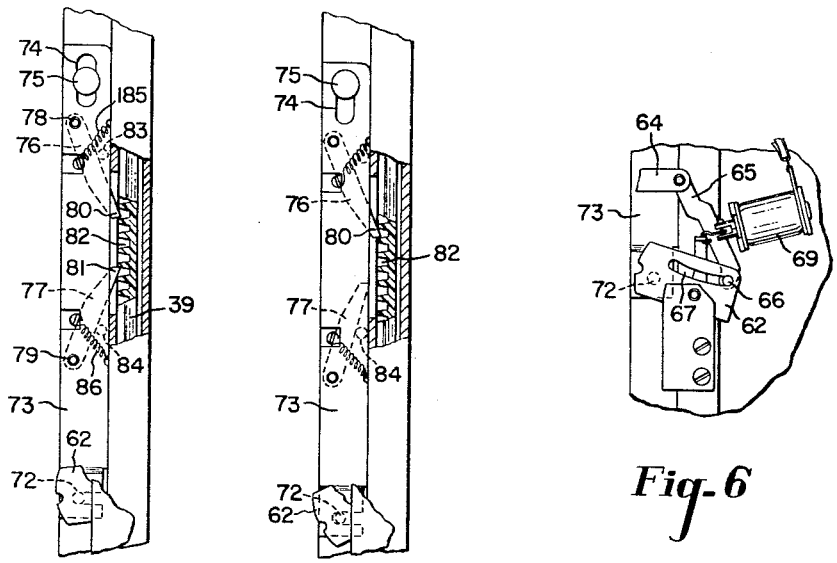
Figures 9, 10, 11:
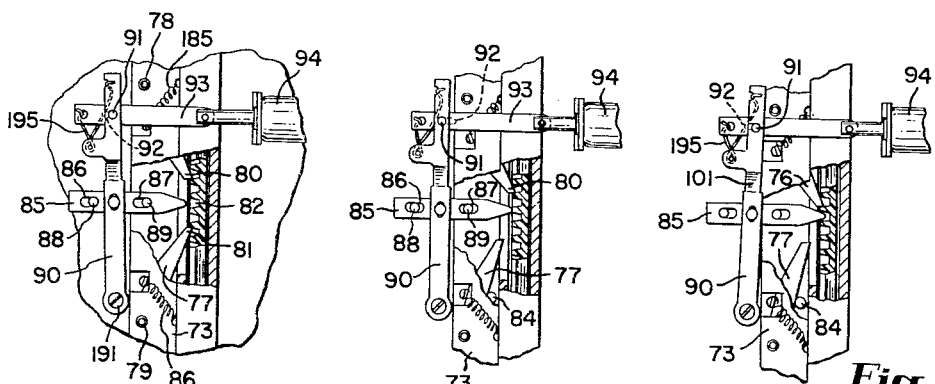

The inventive features of the present invention will be apparent to those skilled in the art upon reference to the following specification, claims, and drawings, of which:

FIGURE 1 is a perspective view of the preferred embodiment of the present invention, showing the front face of the case of a photographic slide projector, wherein a slide storage tray is positioned on a slide tray receiving platform, and furthermore showing the control switches for the projector and the electrical outlet for a remote cord, FIGURE 2 is a top view of the projector of FIGURE 1, showing various internal components in broken lines and showing a portion of the upper wall of the housing broken away, with a photographic slide shown disposed in the projection compartment of the projector, FIGURE 3 is a section view of the projector of FIGURES 2 and 4 taken along the line 3—3, FIGURE 4 is a partial bottom view of the projector, FIGURE 5 is a view similar to FIGURE 4 showing the parts in a different phase of operation, FIGURE 6 is a view of the reversing solenoid, which is adapted to control the direction of movement of the slide storage tray, in a different phase of operation from that shown in FIGURE 4, FIGURE 7 is a view of the slide tray advancing mechanism, showing the driving pawls engaging the gear rack in the slide storage tray, this being the condition of the parts when a slide is positioned at the projection compartment, FIGURE 8 is a showing of the slide tray advancing mechanism of FIGURE 7 with one of the driving pawls moved out of engagement with the gear rack and the other driving pawl providing a force which has moved the slide storage tray a distance equal to the spacing of the individual slides within the tray, FIGURE 9 is a view of the slide tray locking mechanism in the unlocked condition, FIGURE 10 is a view of the slide tray locking mechanism showing the manner in which the slide tray locking pawl leads the slide tray during movement of the tray.

Figure 12:
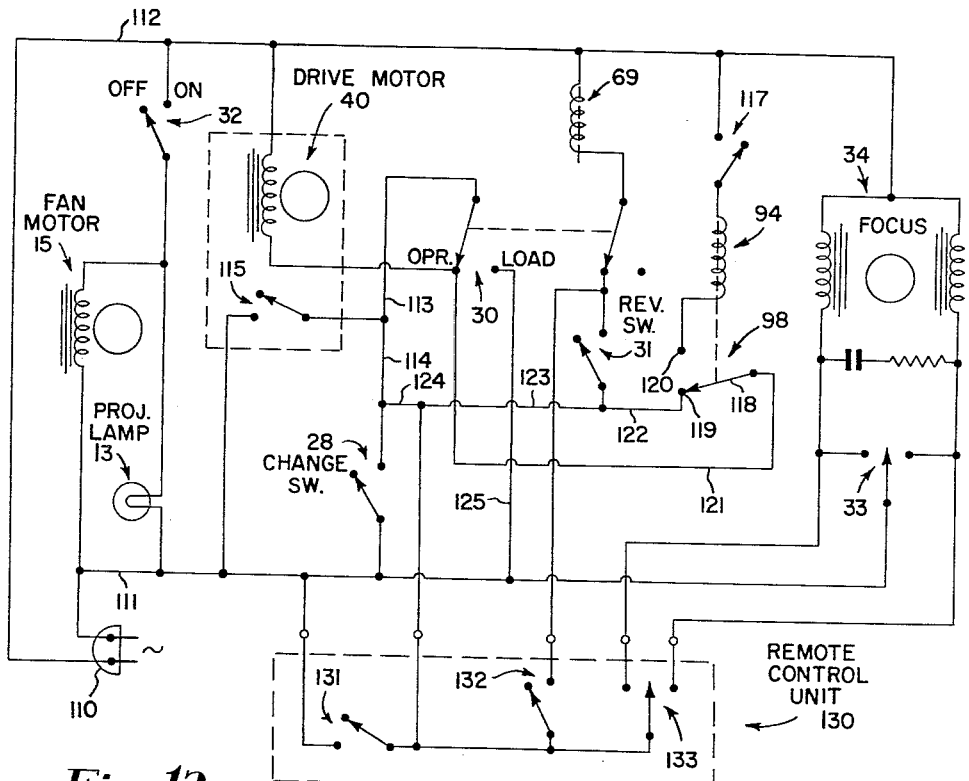

FIGURE 11 is a further showing of the slide tray locking mechanism wherein the slide tray has moved a further distance from that shown in FIGURE 10, and the slide tray locking pawl has now moved into a locking position, and FIGURE 12 is a circuit diagram showing the electrical circuitry of the improved photographic slide projector.

Referring specifically to FIGURE 1, the reference numeral 10 designates the outer case or housing of a photographic slide projector. The forward face of this projector includes an objective lens 11 and the axis of this lens defines the optical axis of the projector. In FIGURE 2, this optical axis can be seen to include a reflector 12, a lamp 13, and a condensing lens system 14. Also shown in FIGURE 2 is a blower motor 15 which provides cooling air.

Referring again to FIGURE 1, the housing of the projector includes a side wall designated generally by means of reference numeral 16. This side wall includes a slide receiving window 17 which leads to a projection compartment which is aligned with the optical axis, designated generally by means of reference numeral 18, see FIGURE 2.

In FIGURE 2 a photographic slide or transparency 19 is held in the projection compartment in alignment with the optical axis of the projector and is therefore adapted to be projected on a screen or the like. The slide is held in this position by means of a permanent magnet 36 which is magnetically coupled to a magnetic clip 20 firmly held on the edge of slide 19. As will be apparent, magnet 37 and its supporting member 21 are portions of a slide changing mechanism and member 21 is movable through a slot 22 to return slide 36 to its compartment within a slide storage tray 23.

This slide storage tray 23 is mounted on a slide tray receiving platform 24, see FIGURE 1, and this platform is further provided with a channel 25 which receives an offset portion 29 (see FIGURE 3) of the slide storage tray 23, this offset portion having an elongated gear rack 82 (see FIGURE 7) to facilitate step movement of the slide storage tray.

Referring again to FIGURES 1 and 2, reference numeral 26 designates the control panel for the slide projector. Starting at the left-hand end of this control panel, the reference numeral 27 designates an electrical outlet which is adapted to be connected to a remote cord to facilitate remote control of the projector. The reference numeral 28 designates a momentary contact change switch which is effective to cause slide 19 to be returned to the slide tray 23, the tray to be moved a distance to bring the next succeeding slide into alignment with window 17, and this next suceeding slide to be moved to the projection compartment. It should be pointed out at this time that while not shown, each of the slides of FIGURE 2 positioned within the slide storage tray are provided with a clip 20 similar to that shown mounted on the edge of clip 19. Reference numeral 30 designates a switch having two positions, designated "oper" for operate, and load. Reference numeral 31 designates a similar switch having a first position designated "fwd" for forward and "rev" for reverse. Reference numeral 32 is a similar switch having an on position and an off position. Switch 33 is a momentary type double pole switch which controls the focusing of the projector.

The reference numeral 34 of FIGURE 2 identifies a reversible electric motor whose direction of rotation is controlled by switch 33. This electric motor drives a roller 35 which mates with the barrel of lens 11 and selectively moves this lens in either direction to focus the projector.

Referring now to FIGURE 3, this figure shows a section view of the projector taken along the line 3—3 of FIGURES 2 and 4. In FIGURE 3 the slide 19 can be shown positioned in aligned positions with the optical axis of the projector and held in slide guides 139 and 140. In this figure the slide tray receiving platform 24 and the channel 25 can be seen more clearly and the offset portion 39 of the slide storage tray can be seen more clearly.

While the various mechanical and electrical components of the slide changing mechanism and the slide tray advancing mechanism can be seen in FIGURE 3, they are more clearly disclosed in FIGURES 4 and 5. FIGURE 4 discloses an electric motor 40 which, through a gear drive arrangement, controls the position of an arm 41, the arm being pivoted at its lower end 42. In FIGURE 3 a portion of the motor has been broken away and the drive shaft 43 can be seen. This drive shaft is connected to control a main gear 44 to cause clockwise rotation through the medium of a belt drive 45. The gear 44 carries a pin 145 mating with an elongated slot 46 formed in arm 41. In this manner, one complete rotation of 360° of gear 44 causes arm 41 to move in a clockwise direction from its position of FIGURE 4 to its position of FIGURE 5 and then return by means of counter-clockwise rotation to its position of FIGURE 4.

The upper end of arm 41 is connected by means of a link 47 to a cam 58 which is mounted on a main control bar 49. As can be seen in FIGURE 3, bar 49 carries a plate 48 which in turn mounts member 21. Plate 48 is mounted directly above control bar 49 by means of two pins 50 and 51 formed in bar 49. These pins mate with elongated slots 52 and 53 formed in plate 48. With the apparatus as shown in FIGURE 4, that is with the slide postioned at the projection compartment 18, plate 48 and rod 49 are locked together by means of a spring biased lever 54, also shown in FIGURE 3. This lever is biased in counter-clockwise direction and is pivotally mounted on the top of plate 49.

As will be evident upon a detailed consideration of the electrical circuit of FIGURE 12, the momentary depressing of change switch 28 completes an energizing circuit for motor 40 which causes this motor to normally run through one complete cycle of operation, provided switch 30 is in the operate position. As a result of operation of the motor, arm 41 rotates in a clockwise direction and causes control bar 49 and plate 48 to move to the right, as seen in FIGURE 5. This movement to the right continues until the photographic slide 19 has been returned to the slide tray 23. When this occurs, member 21 which supports magnet 36 engages and is stopped against the inner surface of wall 16. Furthermore, an extension 55 of arm 54 engages a stationary pin 56 (see FIGURE 4), and as a result lever 54 rotates in a clockwise direction to release pin 51 and allow rod 49 to continue movement to the right, plate 49 being locked in position by a pivoted member 57.

In FIGURE 4, member 57 is shown in its normal position wherein it is maintained by a biasing spring. As bar 49 moves to the right, a cam member 58, carried by bar 49, engages the right hand end of member 57 and causes this member to rotate in a counter-clockwise direction against the force of its bias spring. This action takes place at the same time as pin 51 is released and the left-hand end of member 57 is effective to hook or lock plate 49.

As will be explained, the additional movement or overtravel of bar 49 after plate 48 has been locked in position is effective to actuate the slide tray advancing mechanism. After the slide tray has moved to bring the next succeeding slide into alignment with the slide receiving window 17, the motor continues its operation from the position shown in FIGURE 5 to cause rotation of arm 41 in a counter-clockwise direction, whereupon the overtravel between members 48 and 49 is taken up and plate 48 is unlocked as cam 58 moves to the left to allow member 57 to rotate in a counter-clockwise direction about its centrally located pivot. The bar 49, now carrying plate 48 again locked in position on the end thereof, continues its movement to the left until the second slide is positioned at the projection compartment 18 of the projector.

In this manner, the operator of the projector may selectively control push-button 28 to run through the sequence of slides in the slide storage tray 23, and this may be accomplished from a remote position, as will be apparent from a discussion of FIGURE 12.

Also, the slide changing mechanism may be connected to control a shutter, not shown. This shutter is effective to prevent a flooding of the screen with bright light as a slide is being returned to the slide storage tray.

Referring now to the slide tray advancing mechanism, reference numeral 59, FIGURE 4, identifies a pivoted lever of the slide tray advancing mechanism which at its upper end is provided with an angle portion 60 against which the upper end of arm 41 pushes to actuate the slide tray advancing mechanism. The lower end 61 of lever 59 is provided with a further angle portion which engages a notch in a pivoted plate 62. Engagement of portion 61 in the notch of plate 62 serves to lock the slide tray advancing mechanism, as will be apparent.

Lever 59 is pivoted at pivot 63 and this pivot 63 also carries a second L-shaped arm 64. The main extension of arm 64 is connected to arm 41 by means of a resilient wire 105 having a spring coil at each end thereof. The other portion of arm 64 is connected by means of a link 65 to plate 62. The drive connection between members 64 and 62 is by virtue of a pin 66 carried by the lower end of link 65. Pin 66 mates with an arcuate slot 67 formed in plate 62. Link 65 is biased by means of a spring 68 and the biasing force of this spring is adapted to be overcome by an electrically energizable solenoid 69 which can be called the reversing solenoid and whose energization is controlled by switch 31, the solenoid being energized when the switch is placed in the "rev" position. Energization of solenoid 69 causes link 65 to move to the right such that pin 66 engages the right-hand end of the arcuate slot 67.

The reference numeral 70 of FIGURE 4 identifies a biasing spring which is effective to bias level 59 for counter-clockwise rotation about its pivot 63. Upon energization of motor 40 to cause movement of arm 41 to the right, as above described, the upper portion of this arm 41 engages surface 60 of lever 59 and causes lever 59 to move in a counter-clockwise direction about its pivot 63.

During the first portion of this rotation, the end 61 of lever 59 is lifted out of the notch provided in plate 62, thus freeing this plate for subsequent rotation. As lever 59 continues to rotate, lever 59 engages a cam surface 71 formed on the L-shaped arm 64, the engagement between these two members being shown in FIGURE 5. Plate 62 is connected by means of a pin 72, concealed in FIGURE 4, to a slide rod 73, which is shown more clearly in FIGURES 7 and 8. In FIGURES 4 and 5 the slide member 73 is partially visible but the overall configuration is concealed.

Referring now to FIGURES 7 and 8, slide member 73 can be seen to be mounted on the body of the projector in a movable fashion by means of an elongated slot 74 engaging a stationary pin 75, the length of slot 74 determining the extent of movement which can be achieved by pin 72. Slide member 63 also pivotally carries a pair of slide tray driving pawls 76 and 77, these driving pawls being pivoted at pivots 78 and 79, on the underside of slide 73 as seen in FIGURES 7 and 8. The driving pawls 76 and 77 are oppositely disposed, that is the driving portions 80 and 81 thereof extend into the gear rack 82 formed in portion 39 of the slide tray 23 so as to drive the slide tray in opposite directions. As shown in FIGURE 7, with the portions 80 and 81 both engaging the gear rack 82, the slide tray is locked against movement in either direction.

Reference numerals 83 and 84 designate a pair of stationary stop members which are mounted on the main housing of the projector below slide 73 and driving pawls 76 and 77, as seen in FIGURES 7 and 8. These stop members function to lift one or the other of the driving pawls 76 and 77 out of engagement with rack 82 upon movement of slide 73 so that the other driving pawl is effective to move slide tray 23 due to its engagement with gear rack 82.

Reference numerals 185 and 86 designate springs which are connected to slide 73 and to the driving pawls to bias the driving pawls 76 and 77 respectively into engagement with gear rack 82.

Referring again to FIGURE 5, this figure shows the apparatus in the condition wherein arm 41 has rotated to its maximum counter-clockwise or right-hand position and as a result plate 62 has rotated, in this case in a counter-clockwise direction. The corresponding position of the elements of the slide tray advancing mechanism are shown in FIGURE 8 in which plate 62 is rotated in a counter-clockwise direction and as a result slide 73 has been moved in a downward direction. This movement in a downward direction has caused driving pawl 77 to be lifted out of engagement with gear rack 82 due to the functioning of its stop 84. Driving pawl 76 has remained in engagement with gear rack 82 and as a result the slide tray has been advanced. It will be remembered that FIGURES 7 and 8 are bottom views of the projector as disclosed in FIGURES 1, 2 and 3 and therefore the slide tray has moved in a forward direction, that is it has moved toward the objective lens 11. Had switch 31 been placed in the "rev" position, then solenoid 69 would be energized and link 65 would swing to the right to engage the right-hand end of arcuate slot 67, as shown in FIGURE 6. FIGURE 6 shows plate 62 in the position it assumes with solenoid 69 energized and with the remaining portion of the projector shown in the position of FIGURE 5, that is with arm 41 at is maximum right-hand position. In this case, link 65 is effective to rotate plate 62 in a clockwise direction about its pivot and therefore slide 73 is moved in an upward direction, rather than in a downward direction, as shown in FIGURE 8. The upper direction of slide 73 causes driving pawl 76 to be lifted out of engagement with gear rack 82 and as a result driving pawl 77 causes the slide tray to move in an upward direction, as shown in FIGURE 7. As a result, the slide tray is moved in a reverse direction, that is it is moved in a direction away from the objective lens 11 of FIGURE 1.

As has been pointed out, with the slide tray advancing mechanism as disposed in FIGURE 7, that is while a slide is positioned at projection compartment 18, the slide storage tray is locked by means of the oppositely disposed engagement of driving pawls 76 and 77. When motor 40 is energized to return the slide to the tray, arm 41 moves to the right from the position shown in FIGURE 4, and until the slide tray advancing mechanism is actuated to the position shown in FIGURE 8, the slide tray is locked by the driving pawls 76 and 77.

At this time the slide tray locking mechanism of FIGURES 9, 10 and 11 is effective to lock the slide tray and to maintain the tray locked until arm 41 returns to the position shown in FIGURE 4. As arm 41 begins its return to the left-hand position, lever 59 immediately rotates counter-clockwise as a result of springs 70. However, arm 64 remains in the clockwise position of FIGURE 5 (with the slide tray advancing mechanism disposed as shown in FIGURE 8) until arm 41, through the medium of resilient connection 105, exerts a force on arm 64 to cause it to rotate in a counter-clockwise direction and again reset the slide tray advancing mechanism to the position shown in FIGURES 4 and 7. This action takes place at the end of the counterclockwise rotation of arm 41.

Referring now to the operation of the slide tray locking mechanism which is effective to lock the slide tray during the return movement of arm 41 from its right-hand position to its left-hand position, FIGURE 9 shows this mechanism in its unlocked condition. Reference numeral 85 designates a slide tray locking pawl which is provided with a pair of elongated slots 86 and 87 mating with stationary pins 88 and 89. The position of locking pawl 85 is controlled by a pivoted arm 90, pivoted at 191, and having an upper portion carrying a pin 91 which mates with an elongated slot 92 formed in a linkage 93 connected to the armature of a solenoid 94. A spring 195 is provided to cause pin 91 to normally engage the right-hand end of slot 92. In FIGURE 9 the driving pawls 76 and 77 can be seen and these pawls are in a condition such as shown in FIGURE 7 wherein they are oppositely disposed to engage gear rack 82 and thereby lock slide tray 23 against inadvertent movement.

Referring now to FIGURE 4, reference numeral 95 identifies an L-shaped arm having a portion 96 which is adapted to engage extension 60 of arm 59. The upper cam surface 97 of the L-shaped arm 95 is effective to control a switch designated generally by means of reference numeral 98. Member 95 is pivoted at 99 and is biased for clockwise rotation about this pivot by means of a spring 100. As shown in FIGURE 4, the clockwise rotation of L-shaped arm 95 is limited by engagement with an offset portion 101 of arm 90. As has been above described, energization of motor 40 is effective to cause arm 59 to rotate, and in so rotating L-shaped arm 95 is rotated in a counter-clockwise direction such that cam surface 97 is effective to actuate switch 98, thereby opening the normally-closed portion of this switch and closing the normally-open portion of this switch, as will be more completely described in connection with FIGURE 12.

It is sufficient at this time to say that the closing of the normally-open portion of this switch is effective to energize solenoid 94.

Energization of solenoid 94 is synchronized with movement of L-shaped member 64 and thereby it is synchronized with the slide tray advancing mechanism. The parts are so constructed and arranged that solenoid 94 is actually energized somewhat before the slide tray has completed its movement, and in effect solenoid 94 is energized when the movement has been one-half executed. Therefore, slide tray locking pawl 85 moves into the position shown in FIGURE 10 wherein the right-hand end of pawl 85 engages the face of one of the gear teeth of gear rack 82. As seen in FIGURE 10, the slide tray driving pawls 77 are disposed in the general position of FIGURE 8 wherein the slide tray is in the process of being advanced in a forward direction by means of engagement with driving pawl 76. Also, as seen in FIGURE 10, pin 91 carried by arm 90 now engages the left-hand end of slot 92 so that spring 195 is now exerting a force which tends to move the slide tray locking pawl 85 to the right, this movement being restricted at this time however by means of engagement with the face of one of the gear teeth.

As forward movement of the slide tray progresses, the device finally assumes the position as shown in FIGURE 11 wherein slide tray driving pawl 76 has continued movement of the slide tray and locking pawl 85 has entered the space between two adjacent teeth in gear rack 82, spring 195 being effective to advance pawl 85 to its extreme right-hand position to thereby lock the slide tray. From FIGURE 11 it can be seen that while driving pawls 76 and 77 are no longer in a position to lock the slide tray, locking pawl 85 is now in a position to lock the tray and inadvertent movement of the tray is prevented. This condition of operation continues until solenoid 94 is deenergized as will be explained.

Referring now to the circuit diagram of FIGURE 12, an overall explanation of the operation of the photographic slide projector will now be made, relating the electrical and mechanical components of the projector.

Reference numeral 110 of FIGURE 12 designates a connector which is adapted to be connected to a source of alternating voltage. When connector 110 is so connected, alternating voltage is applied across conductors 111 and 112.

The projector is shown in FIGURE 12 in its off position, with the slide changing mechanism in the position as shown in FIGURES 2 and 3. The closing of on-off switch 32 causes the fan motor 15 and the projector lamp 13 to be energized in parallel, as can be seen in FIGURE 12. If the change switch 28 is now depressed, an energizing circuit for the motor can be traced from conductor 112 through motor 40, switch 30 in the operate position, conductors 113 and 114, and change switch 28 to conductor 111. As a result of this energizing circuit for motor 40, the motor begins movement of the slide changing mechanism. Referring to FIGURE 4, energization of motor 40 causes arm 41 to rotate in a clockwise direction and thereby moves bar 49 to the right. The first portion of the movement of arm 41 moves switch 115 to a closed position. As can be seen in FIGURE 12, switch 115 shunts change switch 28 and completes a holding energizing circuit for motor 40 such that the change switch 28 can now be released. Also, as seen in FIGURE 4, the initial movement of bar 48 to the right causes a cam surface 116 to move sufficiently far to the right to close a switch 117. As seen in FIGURE 12, this switch 117 is in series with solenoid 94.

As has been described, energization of motor 40 first causes the slide change mechanism to move a slide from the projection compartment, such as shown in FIGURE 3, to the slide tray 23. When this movement has been completed, member 57 is effective to lock plate 48, as shown in FIGURE 5, and bar 49 continues movement to the position shown in FIGURE 5. After the slide has been returned to the slide tray, and during this over-travel or continued movement of bar 49, L-shaped arm 95 is effective, by means of its cam surface 97, to actuate switch 98 from a first to a second position. The first position of this switch is shown in FIGURE 4 and in this position movable switch blade 118 engages stationary contact 119. The second position of this switch is shown in FIGURE 5 wherein movable switch blade 118 engages stationary contact 120. As seen in FIGURE 12, the closing of switch 118—120 at this time energizes solenoid 94. This energizing circuit can be traced from conductor 112 through switch 117, solenoid 94, switch 118—120, conductor 121, switch 30 in the operate position, conductor 113, and switch 115 to conductor 111.

Energization of solenoid 94 causes the slide tray locking pawl 85 to be operated as disclosed in FIGURES 10 and 11, above described. FIGURE 9 shows the apparatus with solenoid 94 deenergized. FIGURE 10 shows the condition of operation upon the initial energization of solenoid 94 and in this position the slide tray advancing mechanism has advanced the slide tray a portion of one step of movement and therefore the locking pawl 85 engages a tooth of the gear rack incorporated in the slide tray. Upon further movement of the slide tray by means of the slide tray advancing mechanism, the apparatus assumes the condition shown in FIGURE 11 wherein the energization of solenoid 94 causes the locking pawl 85 to drop into the space between two adjacent teeth of the gear rack and thereby lock the slide tray.

Since switch 30 is in the operate position, motor 40 continues to run and arm 41 now moves back to the left in a counter-clockwise direction from the position shown in FIGURE 5. While this movement of arm 41 allows a lever 59 to return to its position as shown in FIGURE 4, the L-shaped arm 95 cannot return to its original position since it is held in a position to maintain switch 118—120 closed by virtue of engagement of the surface 101 of arm 90 with the L-shaped arm 95. In this manner, solenoid 94 is maintained in an energized position and the slide tray is locked as a slide is moved from the slide tray to the projection compartment within the projector. However, as the slide is moved completely out of the slide tray and approaches its ultimate position within the projector, cam 116 carried by bar 49 actuates switch 117 to again open this switch and thereby deenergize solenoid 94. This allows switch 118—119 to open and causes spring 100 to return the L-shaped arm 95 and the locking pawl 85 to their original positions of FIGURES 4 and 9 respectively.

If it is desired to remove the slide tray from the projector, switch 30 is placed in the load position and this completes an energizing circuit for motor 40 which can be traced from conductor 112 through motor 40, conductor 121, switch 118—119, conductors 122, 123, 124, 114, and 113 to switch 30 in the load position, and conductor 125 to conductor 111.

This energization of motor 40 causes the slide changing mechanism to move in much the same manner as above described. The main difference is that once the slide has been returned to the slide tray and switch 118—119 has been opened, the motor is immediately deenergized and stops in this position. The slide tray may then be removed from the projector, with all of the slides in position in their respective compartments.

When the switch is returned to the operate position, motor 40 is again energized by means of a circuit which can be traced from conductor 112 through motor 40, switch 30 in the operate position, conductor 113 and switch 115 to conductor 111. This circuit returns the apparatus to the position as shown in FIGURES 3 and 4 and motor 40 is deenergized when switch 115 opens.

If it is desired to reverse the direction of movement of the slide tray, switch 31 is moved to the reverse position. In this position, and with switch 30 in the operate position, solenoid 69 is energized in parallel with motor 40. The function of solenoid 69 when energized, is to rotate link 65 (see FIGURE 6) and thereby control the direction of rotation of plate 62 to control the direction of movement of slide 73 and thereby the direction of movement of slide tray 23.

Switch 33 controls the focusing of the projector and as seen in FIGURE 12, the movement of switch 33 to one of its two positions causes energization of focusing motor 43 to cause this motor to run in one direction or the other, the objective lens 11 (see FIGURE 2) is caused to either move to the right or to the left, depending upon the state of energization of motor 34.

Reference numeral 130 designates a remote control unit which contains a first switch 131 connected in parallel with change switch 28 and thereby functioning as a remote change switch. Reference numeral 132 designates a second switch contained in the remote control unit and this switch is connected in parallel with switch 31, thereby forming a remote means for controlling the direction of movement of the slide tray. Reference numeral 133 designates a momentary type double pole switch. This switch is connected in parallel with the components of switch 33 and switch 133 thereby forms a remote means of focusing the projector.

From the above description it can be seen that I have provided an improved photographic slide projector wherein electrically energizable means such as motors and solenoids are utilized to control the slide changing mechanism, the slide tray advancing mechanism, the slide tray locking mechanism, and the means controlling the direction of movement of the slide tray. Furthermore, my improved photographic slide projector combines these features with a magnetic changing device whereby a simple and compact automatic type slide projector is provided having reliable operation which is not susceptible to jamming or to damaging of the slides.

Other modifications of the present invention will be apparent to those skilled in the art and it is therefore intended that the scope of this invention be limited solely by the scope of the appended claims.

I claim as my invention:

1. An electrically operable photographic slide projector having a movable slide tray containing a plurality of individual photographic slides to be projected one at a time on a screen or the like, comprising; an electric motor, a movable control member including means to engage and move one of the photographic slides, means connecting said motor to said control member to control movement thereof, an initial energizing circuit for said motor including a manually operable normally open change switch, a motor holding circuit including a motor switch which is closed upon initial movement of said motor and is opened at the end of one cycle of operation of said motor to maintain said motor energized independent of said manually operable switch, said control member being effective during said cycle of operation to move a first slide from a projection position to a slide changing position wherein the first slide is returned to the slide tray and the slide tray is advanced to allow a second slide to be returned to said projection position at the end of said cycle, a further normally open switch controlled by said control member to be actuated to closed position as said control member moves to said slide changing position, a solenoid, an energizing circuit for said solenoid including in a series circuit said normally open switch and said motor switch, said energizing circuit being effective to energize said solenoid upon said control member moving to said slide changing position, means controlled by said solenoid when energizing to maintain said further normally open switch in closed position so long as said solenoid is energized, and a slide tray lock controlled by said solenoid to lock said slide tray upon energization of said solenoid and thereby prevent movement of said slide tray as the second slide is moved to the projection position, said solenoid being de-energized at the end of said cycle due to opening of said motor switch.

2. An electrically operable slide projector of the type having a movable slide tray which holds a plurality of individual slides and is movable to allow the slides to be projected one at a time, comprising; a movable control member including means adapted to engage a slide in the slide tray and move this slide to a projection position wherein the slide is projected on a screen or the like, an electric motor connected to control movement of said control member, said motor having a rest position wherein said control member is positioned at said projection position, a single-pole double-throw switch having an operate and a load position, a normally open manually operable change switch; initial energizing circuit means for said motor including in series said motor, said first named switch when in said operate position, and said change switch; a motor switch which is closed upon initial movement of said motor and remains closed until said motor completes a cycle of operation and returns to said rest position, a holding energizing circuit for said motor including said motor switch connected in parallel with said change switch; said motor being effective upon being energized to move said control member in a manner to cause a first slide to be returned from said projection position to the slide tray, and to then cause the slide tray to advance, whereupon a second slide is returned to said projection position at the end of the cycle of said motor; a further switch controlled by said motor and effective to be opened at the time during said cycle in which the first slide is returned to the slide tray, circuit means connecting said further switch in parallel with said first named switch in said operate position, and circuit means connecting said first named switch when in said load position in parallel with said change switch such that movement of said first named switch to load position causes said motor to be energized through a series circuit including said motor, said further switch, and said first named switch when in said load position to thereby cause said motor to stop as soon as the first slide is returned to the slide tray to thereby facilitate removal of the slide tray from the projector with all of the slides contained therein.

3. In combination, an electrically operable slide projector of the type having a removable slide tray containing a plurality of individual slides to be projected one at a time on a screen or the like, in which a slide changing mechanism is effective to move the slides one at a time between the slide tray and a project position, while causing the slide tray to move in a step fashion as the slides are sequentially projected; an electrically operable motor connected to drive the changing mechanism, one cycle of motor operation being effective to move a first slide from the project position back to the slide tray, to then move the slide tray one step, and to then move a second slide to the project position; a normally open manually operable change switch; momentary energizing circuit means for said motor including in series said motor and said change switch; a motor switch controlled by said motor, closed upon initial movement of said motor, and maintained closed until the end of a cycle of motor operation; means connecting said motor switch in parallel with said change switch; a further switch arranged to be closed by said motor at the time during said cycle of operation in which the first slide is returned to the slide tray and the slide tray is moved a step to the next slide, a solenoid operative when energized to both lock the slide tray to prevent movement thereof and to maintain said further switch closed; and energizing circuit means for said solenoid including in series said motor switch and said further switch, said solenoid being effective to thereby lock the slide tray and prevent accidental movement thereof as the second slide is moved to the project position.

4. In combination, an electrically operated slide projector of the type having a removable slide tray containing a plurality of individual photographic slides adapted to be projected one at a time on a screen or the like, in which a slide changing mechanism is effective to move the slides one at a time between the slide tray and a projection position, while causing the slide tray to move in a step by step fashion as the slides are sequentially projected; an electric motor, means connecting said motor to said slide changing mechanism to cause movement thereof when said motor is energized, said motor having a rest position wherein said slide changing mechanism positions a slide at said projection position, subsequent energization of said motor for one cycle of operation causing the slide to be returned to the slide tray and a second slide to be moved to said projection position; a first switch which is normally closed and is moved to an open position when said slide changing mechanism is moved to a position to return the slide to the slide tray, whereupon all of the slides are in position in the slide tray, a normally open change switch, motor energizing circuit means including in series with said first switch and said change switch; a normally open motor switch moved to a closed position upon initial movement of said motor from said rest position and again moving to an open position when said motor completes one cycle of operation and returns to said rest position, circuit means connecting said motor switch in parallel with said change switch; a single-pole double-throw control switch having a load and an operate position, said control switch in said operate position being connected in parallel with said first switch to shunt said first switch to prevent deenergization of said motor when said slide changing mechanism is moved to said position to return the slide to the slide tray, said control switch in said load position being connected in parallel with said change switch to complete an energizing circuit for said motor whereupon said motor is deenergized when said first switch opens as said slide changing mechanism is moved to said position to return the slide to the slide tray, to thereby facilitate the removal of the slide tray from the projector; a slide tray lock including a solenoid and a lock pawl controlled thereby which is adapted to lock the slide tray upon energization of said solenoid, a second switch which is normally open and is controlled concurrently with said first switch, circuit means connecting said solenoid and said second switch in a series circuit and in parallel with said motor so that said solenoid is energized only upon said control switch being in said operate position to thereby lock the slide tray as the second slide is moved therefrom to the projection position; and further means controlled by said solenoid to maintain said first and second switches in an open and a closed condition respectively so long as said solenoid is energized, said solenoid being subsequently deenergized as said motor returns to said rest position and opens said motor switch.

References Cited in the file of this patent
UNITED STATES PATENTS

| | | |
|---|---|---|
| 2,289,833 | Fuller et al. | July 14, 1942 |
| 2,401,506 | Pechkranz | June 4, 1946 |
| 2,593,727 | Cadwell et al. | Apr. 22, 1952 |
| 2,874,497 | Huff et al. | Feb. 24, 1959 |